US005468024A

United States Patent [19]
Carman et al.

[11] Patent Number: 5,468,024
[45] Date of Patent: * Nov. 21, 1995

[54] QUICK CONNECTOR

[75] Inventors: Anthony K. Carman, Waterford; Duane J. Pontbriand, Metamora, both of Mich.

[73] Assignee: ITT Corporation, New York, N.Y.

[ * ] Notice: The portion of the term of this patent subsequent to Nov. 1, 2011, has been disclaimed.

[21] Appl. No.: 332,673

[22] Filed: Nov. 1, 1994

Related U.S. Application Data

[63] Continuation-in-part of Ser. No. 35,823, Mar. 23, 1993, Pat. No. 5,360,237.

[51] Int. Cl.$^6$ .................................................. F16L 35/00
[52] U.S. Cl. ........................ 285/81; 285/319; 285/921; 285/305; 24/573.1; 24/10 R
[58] Field of Search ........................... 281/319, 921, 281/81, 82, 114, 305; 24/16 R, 545, 547, 573.1, 543, 555

[56] References Cited

U.S. PATENT DOCUMENTS

| | | | |
|---|---|---|---|
| 1,436,882 | 11/1922 | Knepper | 285/319 |
| 2,413,730 | 1/1947 | Samiran | 285/82 X |
| 3,469,864 | 9/1969 | Guerrero | . |
| 3,801,954 | 4/1974 | Dorrell | 285/82 X |
| 3,858,915 | 1/1975 | DeVincent | 285/924 X |
| 3,945,669 | 3/1976 | Bochory | 285/82 |
| 4,244,608 | 1/1981 | Stumky | 24/573.1 |
| 4,874,174 | 10/1989 | Kojima et al. | 285/82 |
| 5,046,765 | 9/1991 | Usui | 285/305 |
| 5,069,424 | 3/1991 | Dennany et al. | . |
| 5,112,085 | 5/1992 | Busch et al. | 285/319 X |
| 5,152,555 | 10/1992 | Szabo | 285/319 X |
| 5,195,787 | 3/1993 | Bartholomew | 285/921 X |
| 5,350,201 | 9/1994 | Bynum | 285/921 |
| 5,354,102 | 10/1994 | Carman | 285/81 |

FOREIGN PATENT DOCUMENTS

| | | | |
|---|---|---|---|
| 2291438 | 6/1976 | France | 285/924 |
| 2949 | of 1902 | United Kingdom | 285/81 |
| 9015281 | 12/1990 | WIPO | 285/319 |

*Primary Examiner*—Randolph A. Reese
*Assistant Examiner*—Heather Chun Shackelford
*Attorney, Agent, or Firm*—Dykema Gossett

[57] ABSTRACT

A quick connector for fast connection of fluid carrying assemblies such as a mating tube and a fluid unit. The connector includes a connector body which houses the connector components and accepts a redundant clip which is adapted to engage an upset bead of the male tube. The redundant clip is generally L-shaped and includes a retaining head which is inserted into the connector body and is adapted to engage the upset bead, a body portion which extends along the side of the connector body and in the preferred embodiment is contoured to mate with the connector body and a base member which includes a camming edge for facilitating the insertion of the retainer head into the connector body.

19 Claims, 4 Drawing Sheets

QUICK CONNECTOR

BACKGROUND OF THE INVENTION

This application is a Continuation-In-Part of the application No. 35,823 filed Mar. 23, 1993, now U.S. Pat. No. 5,360,237, issued Nov. 1, 1994.

This invention generally relates to quick connectors and more particularly to a redundant clip for quick connectors. More particularly, the present invention is an improvement over the Quick Connector disclosed in U.S. patent application 08/012,715 filed Feb. 3, 1993, and assigned to the assignee of the present application.

Quick connectors are known and have been widely used in the art and are used in fluid carrying assemblies such as automobile assembly plants and service centers. More recently, these connectors have been provided in the form of a unitary connector body which is Joined with the male end of a mating tube. The recent connectors use an internal connector component which receives an upset bead on the male tube member to retain the male tube member within the unitary connector. These recent connectors utilize either a pair of O-rings or a one-piece seal with multiple ribs to seal the male member with respect to the unitary connector. The O-rings or ribs surround the center male end of the mating tube. These connectors have the disadvantage that if an accidental disconnection occurs, fluid can flow out of the connector body. These connectors have the further disadvantage that an indication as to whether a proper lock connection has been provided is not readily apparent.

U.S. Pat. No. 5,069,424 issued to Robert Dennany and Ken Randall and assigned to the assignee of the present invention, ITT Corporation, addresses the above problems that occur with single clips. The '424 patent discloses a secondary retaining clip which had means for engaging a portion of the housing to releasably lock the secondary retaining clip to the housing. This retaining clip has resilient finger portions which are received within annular grooves in the unitary connector housing. The retaining clip has an inwardly directed portion which will engage the bead of the male tube if it is attempted to be removed. The secondary clip can only be connected if the male tube is properly received within the unitary connector.

One disadvantage of the '424 connector is that it requires an annular groove to be formed in the housing. Further, the secondary clip would likely require one or more tools in order to remove the resilient fingers from the annular groove formed in the housing.

SUMMARY OF THE INVENTION

The present invention overcomes the above problems with known quick connects and redundant quick connects and provides other advantages as well.

The presently most preferred embodiment of this invention discloses a locking clip for use in redundantly retaining a male member within a female connector. The male member has an upset portion and the female connector has a recess for receiving the male member, the upset, and a primary retaining clip. The primary retaining clip is principally responsible for retaining the male member within the female member. The primary clip has locking tabs positioned adjacent the upset when the male member is fully inserted into the female member. The locking tabs define a line of engagement beyond which the upset cannot pass after having been fully inserted.

The locking clip includes a body portion and a retaining head having spaced fingers adapted to be received within the female member. The fingers are generally flat members which extend from the body portion and are generally parallel to one another. The spaced fingers have free ends that when fully inserted into the female member are at least at the line of engagement, and preferably extend beyond the line of engagement.

A base portion extends from the end of the body portion. The base portion is defined by spaced leg members which are spaced apart a distance which is slightly less than the outer diameter of the female connector so that the legs bias against the female connector when the redundant clip is locked in place. The female member includes a portion with a reduced diameter which defines an engaging ledge. The base portion of the clip is adapted to engage the engaging ledge when the clip is installed onto the female member.

In the preferred embodiment, the leg members have a top edge that defines a cam surface for engaging the female connector at the engaging ledge to facilitate movement of the clip to the clipped position. Further, the leg members have opposed detents to receive the reduced section when the clip is in the clipped position.

As is typical, the female member has an exterior surface that is contoured to define at least a first section, a reduced diameter second section and a third section that has an outer diameter greater than the second section. The first and second sections have the engaging surface therebetween.

Although the preferred embodiment relies upon the cam surface to facilitate clipping the clip on the female member, in another embodiment, the legs are sufficiently flexible to flex about the second or third sections and ultimately snap about the second section when the clip is clipped in place. This simplifies installation and removal of the clip.

As should be appreciated, the clip can be locked and unlocked without the need for tools. The clip is an exterior clip which is highly reliable and gives a clear indication when the clip is properly fastened. The clip is only properly fastened when the body member of the clip is adjacent and parallel to the body housing. In the preferred embodiment, the mating contour of the inside edge of the body member of the clip with the exterior surface of the housing make a sure indication of proper alignment. It also provides the advantage of a redundant or a secondary clip to ensure against improper installation of the primary clip. A still further advantage is that the clip does not require modification of a standard connector housing, the clip is merely snapped over a reduced portion of the standard housing. The clip is also less expensive to manufacture, easier to clip onto a housing and able to be used in tight spaces. A still further advantage is that the legs of the base are more resilient and can be used on various sizes of connectors. Overall, it is a much more versatile clip than previously available.

An alternative embodiment of the present invention provides an improved secondary or redundant clip for connecting a male tube to a unitary connector or connector housing. In the disclosed embodiment the male tube includes an upset portion and the connector housing has a recess for receiving the male tube and the upset. The connector housing has an exterior surface that is contoured to define at least a first section and second section, with the second section having reduced diameter. As further disclosed in the preferred embodiment, the connector housing includes a primary connector assembly for primarily retaining the tube in the housing.

The alternative embodiment of the clip of the present invention is generally L-shaped and includes a retaining head, a body portion and a base portion. The retaining head is adapted to engage the upset of the male tube when the male tube is positioned within the recess of the connector housing. The retaining head is defined by a pair of spaced fingers ending in engaging ears. The engaging ears extend inwardly with respect to each other to form a reduced space between the fingers. The reduced space has a width which is less that the diameter of the male tube so that the ears have to be biased outwardly to receive the male tube.

The retaining head extends outwardly from the body portion at an angle with respect to the body portion and is spaced from the body portion by a distance slightly greater that the distance between the exterior surface of the connector housing and the recess.

The body portion is defined by a channel having a base and sidewalls. The sidewalls extend generally perpendicular to the base. In the preferred embodiment, the sidewalls have an edge that is contoured to generally mate with the exterior contour of the connector housing.

The base portion is defined by spaced leg members which extend outwardly from the body portion and are preferably joined at their ends. The leg members are spaced apart a distance which is slightly less than the outer diameter of the reduced section of the connector housing so that they bias against the reduced section. In the preferred embodiment, the leg members have first and second spaced detents to receive the reduced section. These detents correspond to the latched and unlatched positions of the clip. Each of the leg members includes a top edge that defines a cam surface for engaging the bottom of the reduced surface to facilitate the insertion of the retaining head into the recess of the connector housing and for locking the clip in place. The cam and leg members act as a lever giving substantial mechanical advantage to insertion of the head portion. The cam surface ends in a locking surface which is adjacent the body portion and is adapted to engage the bottom of the reduced surface when the clip is in the latched position. This engagement provides the needed retention force to retain the tube in the connector.

In use, the clip is mounted to the connector housing by the base member. It is intended that the clip always remain attached to the connector housing and in particular to the reduced section. In the disclosed embodiment, the clip is mounted onto the reduced section by separating the legs and placing the reduced section between them and then snapping the free ends of the legs together. The legs are biased against the reduced section of the connector housing and can slide with respect to the housing.

To use the clip, the first step in locking the male tube with respect to the connector housing is to rotate the clip against the male tube. With slight pressure against the base of the body member, Just behind the retaining head, the engaging ears can be forced apart and about tube. Rotation of the clip is facilitated by the interaction of the detent with respect to the reduced section which, in combination, acts as a pivot point. The edge of the base member abuts the base of the second section when the ears are clipped about the tube.

By next applying pressure to the base of the body portion of the clip just behind the base member, the legs slide along the reduced section and the cam surface is caused to cam against the base of the reduced section. It should be appreciated that the ears are biased against the tube and form a second pivot point with respect to the tube. As pressure is applied to the body portion, the ears simultaneously pivot and slide with respect to the tube in the direction of the connector housing as the cam surface is cammed against the base of the reduced section.

After rotation of the clip, the second detent on the legs of the clip engages the reduced section and the retaining head is securely inserted into the connector housing to retain the tube therein. The top edge of the legs abuts the base in this position. In this way, the retention force of the clip or the pull-out strength is determined by the shear strength of the body member at the joinder of the head and base member.

To disconnect the tube from the connector housing, the base member is slid away from the connector housing. The edge and cam abut the base and the retaining head is slid out of the connector housing. A surface on the engaging ears can be pushed by the user to spread open the fingers to release the retaining head from the tube. The clip is then in the unlocked position.

As should be appreciated, the clip can be locked and unlocked without the need for tools. Additionally, the clip remains on the housing so that it is not misplaced and so that it is much easier to ship with the housing. The clip is an exterior clip which is highly reliable and gives a clear indication when the clip is properly fastened. The clip is only properly fastened when the body member of the clip is adjacent and parallel to the body housing, in the preferred embodiment, the mating contour of the inside edge of the body member of the clip with the exterior surface of the housing make a sure indication of proper alignment. It also provides the advantage of a redundant or a secondary clip to ensure against improper installation of the primary clip. A still further advantage is that the clip does not require modification of a standard connector housing, the clip is merely snapped over a reduced portion of the standard housing.

The most preferred embodiment described above is most preferred because it overcomes some disadvantages associated with the alternative embodiment. The alternative embodiment is intended to be tethered to the female connector which requires that the base be fairly long to accommodate closing means. This requires more material and increases costs. Additionally, when connected, the alternative embodiment extends beyond the female clip a considerable distance making the clip difficult to use in tight locations. Further, due to the clip being tethered, the head is shorter to facilitate assembly. This shorter head is not long enough to form a double lock on the upset of the male member at the line of engagement which is defined by the locking fingers of the primary retainer. For the redundant clip to act against the upset, the upset must be outside the locking fingers of the primary retainer. Such a condition only exists when the male member has not been properly inserted or the primary retainer has failed. Still further, the clip requires several steps for assembly.

DETAILED DESCRIPTION OF THE PREFERRED EMBODIMENTS

Figure 1:
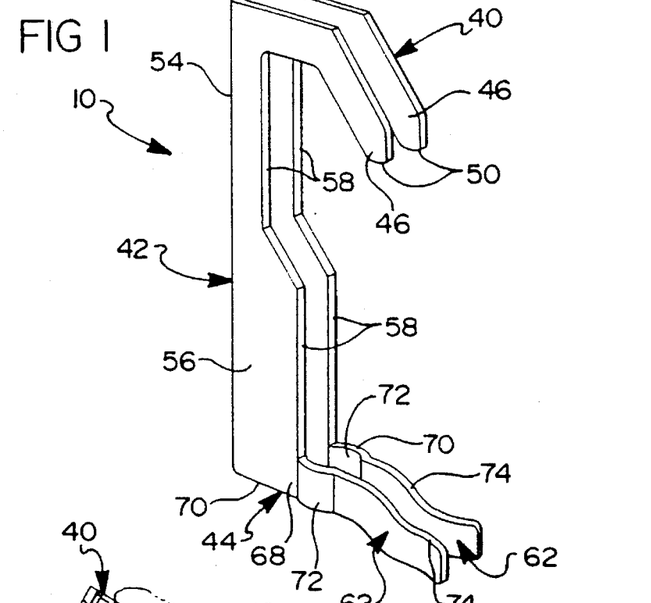
FIG. 1 is a perspective view of the preferred embodiment of the clip of the present invention.
Figure 2:
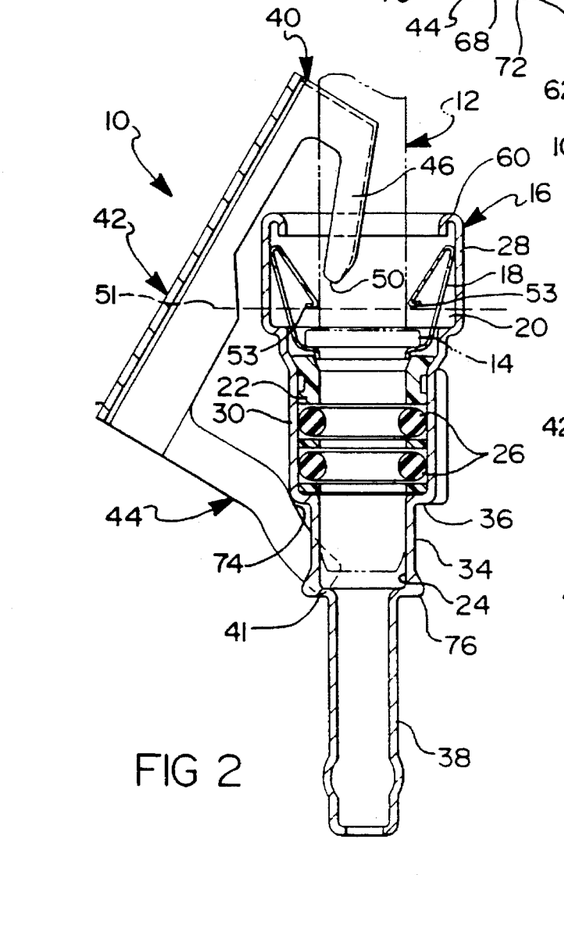
FIG. 2 is a side view of the present invention in the unlocked position.
Figure 3:
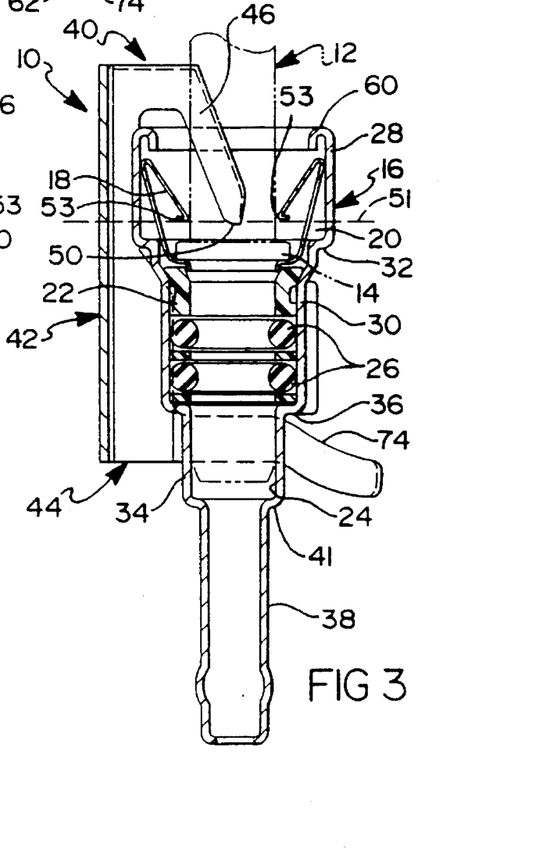
FIG. 3 is a side view of the present invention in the locked position.

With reference to FIG. 1, the redundant clip of the present invention is shown generally at 10. In the preferred embodiment, the clip is made from 301 stainless steel, ¾ hard with a thickness of 0.032 to 0.036 inches. The clip is used to retain a tube 12 within a connector housing 16. As should be appreciated, the tube 12 and the connector housing 16 are standard quick connects. With reference to FIGS. 2 and 3, the tube 12 includes an upset 14 and in the disclosed embodiment the connector housing 16 includes locking fingers 18 mounted in the interior 20 of the housing. The fingers 18 are adapted to retain the tube 12 within the female housing 16. The connector housing includes a top hat 22 and a bearing surface 24 for maintaining the alignment of the tube 12 within connector housing 16. O-rings 26 are provided to seal the male tube 12 with respect to the connector housing 16.

The exterior of connector housing 16 is contoured and has an exterior surface defined by a first section 28, a reduced diameter second section 30 which is separated from section 28 by a base 32. A further reduced diameter third section 34 which is separated from section 30 by a base 36. A still further reduced section 38 which is separated by a base 41. Section 38 is adapted to be inserted into a hose member.

Broadly, the redundant quick connector 10 of the present invention is generally L-shaped and has a retaining head 40, a body member 42 and a base member 44. The retaining head 40 is adapted to be inserted into the connector housing 16 and locked against the upset 14 of the tube 12 if the tube is attempted to be pulled out of housing 16. The body member 42 joins the retaining head 40 and the base member 44 and is adapted to adjoin the connector housing 16 and to provide retention support to the clip 10. The base member 44 clips to the connector housing 16 and in the preferred embodiment provides a camming surface for facilitating the locking of the clip 10.

The retaining head 40 is adapted to engage the upset 14 of tube 12. The retaining head 40 is generally hook shaped and is defined by a pair of spaced fingers 46. As disclosed, the spaced fingers have a generally flat end portion 50 for engaging the upset 14.

The fingers 46 are generally flat and parallel to one another. The length of fingers 46 is sufficiently long to insure that the flat end portion 50 is at least at the line of engagement 51. Line of engagement 51 is the imaginary line defined by the ends 53 of locking fingers 18.

The body portion 42 is defined by a channel having a base 54 and sidewalls 56. The sidewalls 56 extend generally perpendicular to base 54 and end in an edge 58. In the disclosed embodiment, the edge 58 is contoured to have the same general shape as and to generally mate with the exterior contour of connector housing 16. The channel shape of body portion 42 adds strength to the clip and provides tube pull-off retention in excess of 100 LBS force.

As can be seen, the retaining head 40 extends outwardly from the body portion 42 at an angle with respect to the body portion 42. The retaining head 40 is spaced from the body portion 42 by a distance which is slightly greater than the width of the overturned edge 60 of the connector housing 16. This space allows the retaining head 40 to be inserted into the connector housing 16.

The base portion 44 includes spaced leg members 62 which extend outwardly from body portion 42. Leg members 62 are preferably elongated relatively thin members having sides 68 and top and bottom edges 70. The sides 68 are spaced apart a distance which is slightly less than the outer diameter of the third section 34 of connector housing 16. Because the distance is less, legs 64 are biased against third section 34, but are free to slide with respect to section 34. Each of the sides 66 have outwardly bowed sections or detents 72 for receipt of the third section 34 as leg members 64 are slid along the third section 34. Detent 72 corresponds to the locked position, see FIG. 3, of clip 10.

The top edge 70 of each leg member 62 defines a cam surface shown generally at 74. The cam surface 74 functions to pull the retaining head 40 into the connector housing 16 and facilitates movement of the connector 10 to its clipped position. Cam surface 74 engages the base 36 of the second section 30. In the embodiment illustrated in FIG. 1, the third section 34 has a guide or retaining surface 76 to keep the leg members 62 adjacent to the base 36. It should be understood that some connectors do not have feature 76. It is not necessary to the proper functioning of the clip 10.

Referring now to FIGS. 2 and 3, the camming action of edge 74 is illustrated. With pressure applied to base 54 of body member 42 just behind the base member 44, the legs are caused to slide along the third section 34 and the cam surface 74 is caused to cam against the base 36. It should be appreciated that the ears 48 are biased against the tube 12.

To attach the clip 10 to the connector 16, the spaced fingers 46 are inserted into the female connector 16. See FIG. 2. Pressure is then applied to the body member 42 forcing the leg members 62 apart and sliding them over the third section 34. The clip 10 is fully clipped onto the connector 16 when the section 34 is received within detents 72. To facilitate the snapping of clip 10 onto connector 16, the free ends 64 of legs 62 are turned outwardly so that it is easy to begin the spreading of legs 62.

The legs 62 are preferably sufficiently resilient so that the clip 10 is easily snapped in place. In the preferred embodiment, the legs 62 are sufficiently resilient so that if the cam surface 74 does not engage against base 36, the legs can still be spread and snapped in place.

With reference to FIG. 3, the clip 10 is in the locked position. In this position, the detent 72 is engaging the third section 34 and the retaining head 40 is inserted into the connector housing to retain the tube 12 therein. The top edge 70 of legs 62 is abutting the base 36. In this way, the retention force of the clip or the pull-out strength is determined by the shear strength of the body member 42 at the intersection of the head 40 and base member 44. As should be appreciated, the tip 50 of ears 48 is generally aligned with the line of contact of the detent 72 and the base member 36 to reduce the bending moment in the body member 42. Additionally, the edge 58 is illustrated as closely conforming to the outer contour of the connector housing 16.

To disconnect the tube 12 from the connector housing 16, the base member is slid away from the connector housing 16 to the position illustrated in FIG. 2. The edge 70 cams against base 36 until legs 62 are free of the connector 16 and the retaining head 40 can then be slid out of the connector housing 16.

As should be appreciated, the clip 10 can be locked and unlocked without the need for tools. What has been disclosed, is a quick connector which provides a redundant clip having superior pull-off strength which is easy to manufacture and easy to use and that does not require the use of tools. Additionally, the clip provides visual indication of a properly locked assembly and precludes outflow of fluid if there is improper connection of the primary connector, and which overcomes the disadvantages of the prior art. The form of the invention illustrated and described herein is a preferred embodiment of these teachings. It is shown as an illustration of the inventive concepts, however, rather than by way of limitation, and it is pointed out that various modifications and alterations may be made within the scope of the appended claims.

Figure 4:
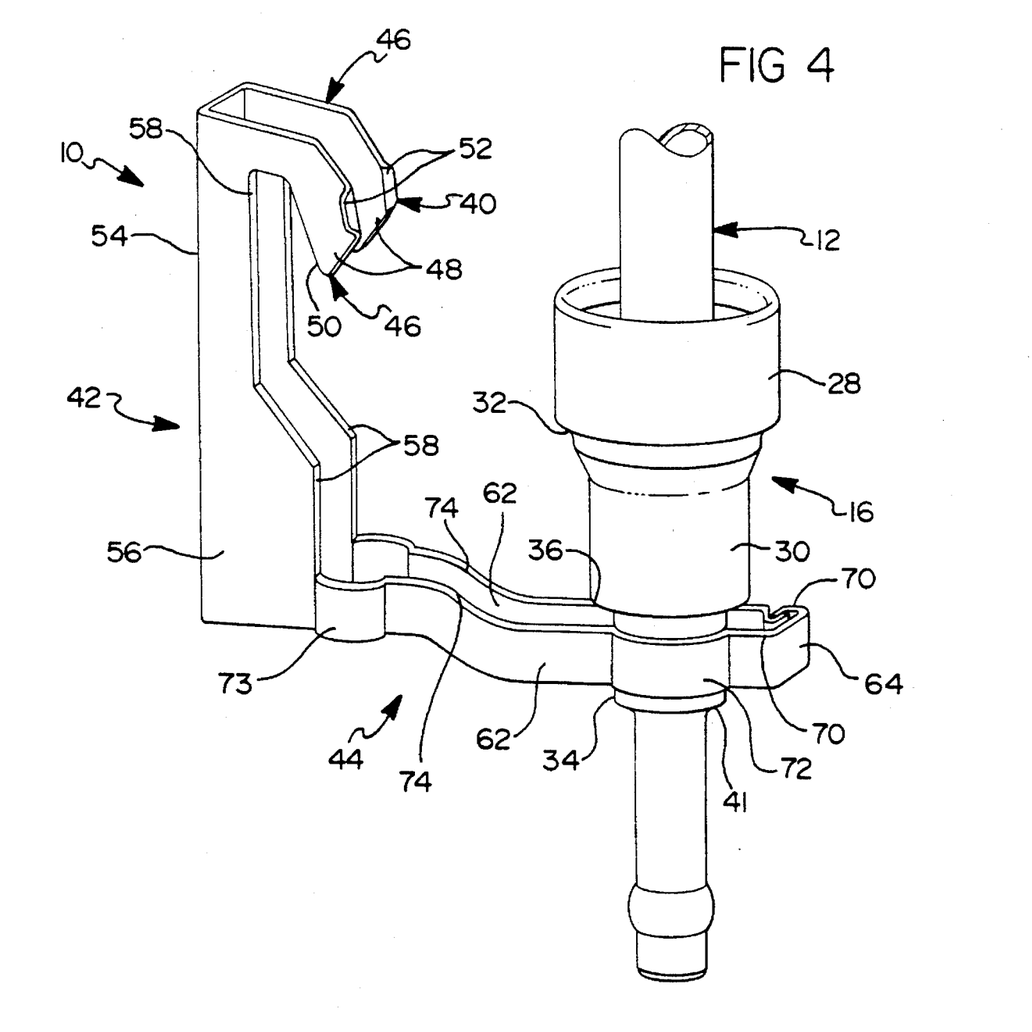
FIG. 4 is a perspective view of another embodiment of the present invention attached to a tube connector.

With reference to FIG. 4, another embodiment of the redundant clip of the present invention is shown generally at 10. In the preferred embodiment, the clip is made from 301 stainless steel, ¾ hard with a thickness of 0.032 to 0.036 inches. The clip is used to retain a tube 12 within a connector housing 16. As should be appreciated, the tube 16 and the connector housing 12 are standard quick connects. The tube 12 includes an upset 14 and in the disclosed embodiment the connector housing 16 includes locking fingers 18 mounted in the interior 20 of the housing. The fingers 18 are adapted to retain the tube 12 within the female housing 16. The connector housing includes a top hat 22 and a bearing surface 24 for maintaining the alignment of the tube 12 within connector housing 16. O-rings 26 are provided to seal the male tube 12 with respect to the connector housing 16.

The exterior of connector housing 16 is contoured and has an exterior surface defined by a first section 28, a reduced diameter second section 30 which is separated from section 28 by a base 32. A further reduced diameter third section 34 which is separated from section 30 by a base 36. A still further reduced section 38 which is separated by a base 41. Section 38 is adapted to be inserted into a hose member.

Figures 5, 6:
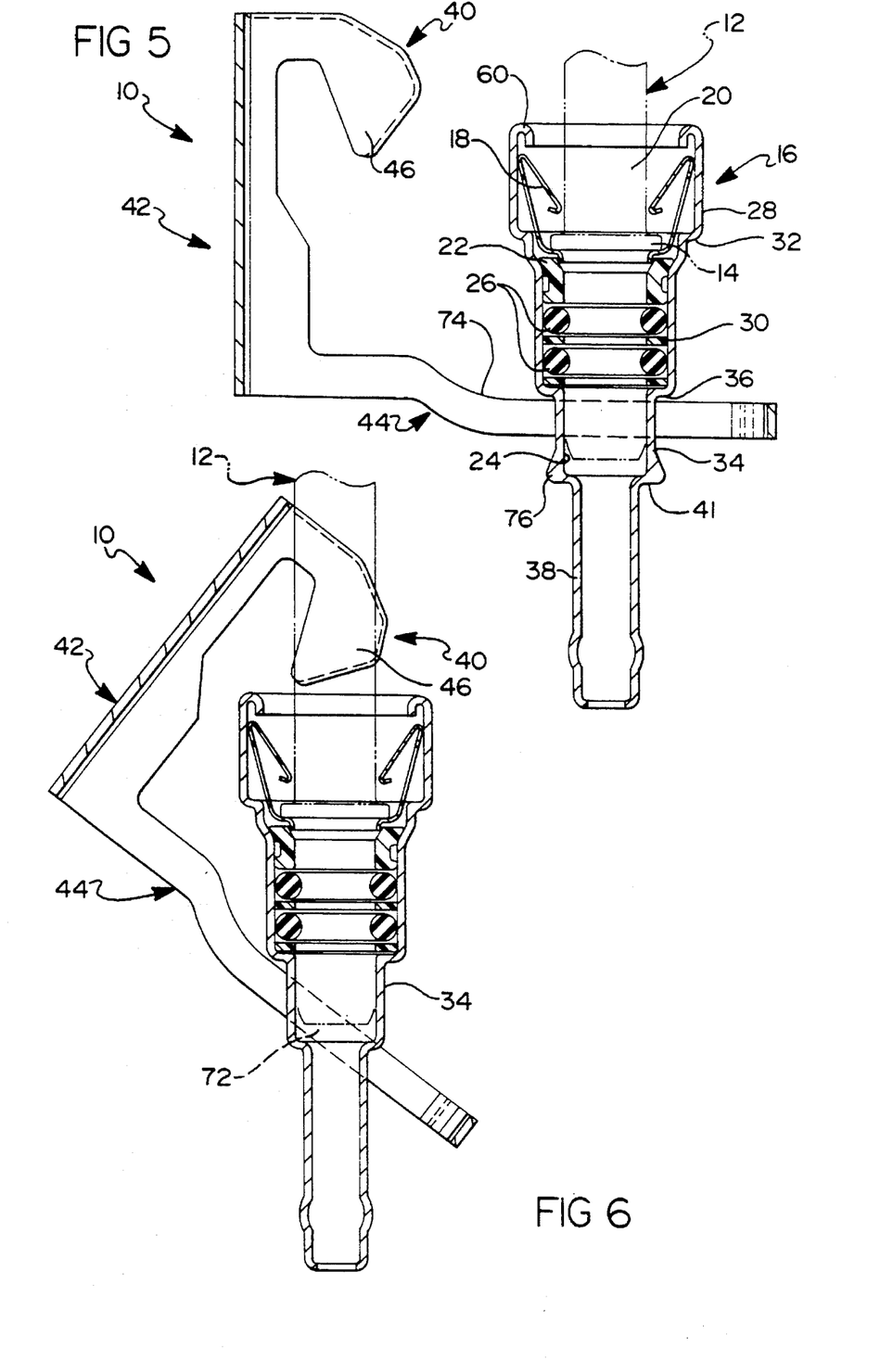
FIG. 5 is a side view of the present invention in the unlocked position.
FIG. 6 is a side view of the present invention as it is rotated to or from the locked position.
Figures 7, 8:
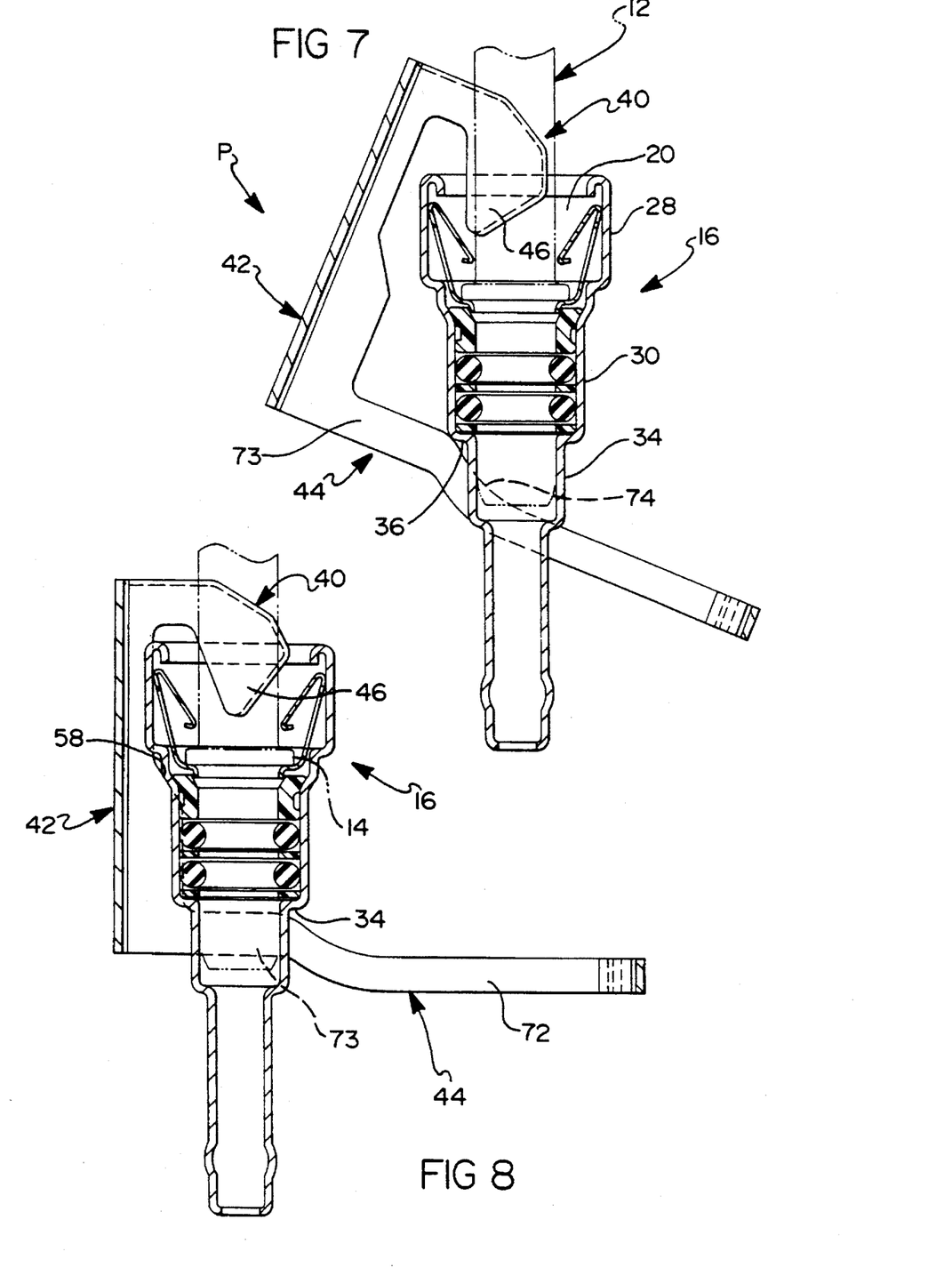
FIG. 7 is a side view of the present invention in the camming position.
FIG. 8 is a side view of the present invention in the locked position.
Figure 9:
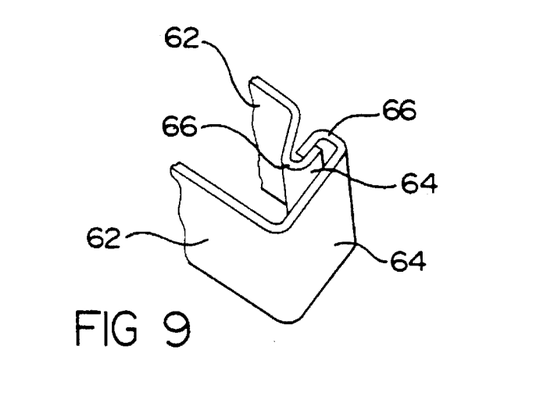
FIG. 9 is a partial view of the ends of the base member of the clip of the present invention.

With reference to FIG. 4, the unlocked or shipping position of connector 10 is illustrated. FIG. 7 illustrates the locked position of connector 10. FIGS. 5 and 6 illustrate the primary positions of the connector 10 as it is moved from the unlocked to the locked positions.

Broadly, the redundant quick connector 10 of the present invention is generally L-shaped and has a retaining head 40, a body member 42 and a base member 44. The retaining head 40 is adapted to be inserted into the connector housing 16 and locked against the upset 14 of the tube 12. The body member 42 joins the retaining head 40 and the base member 44 and is adapted to adjoin the connector housing 16 and to provide retention support to the clip 10. The base member 44 interconnects the clip to the connector housing 16 and provides a camming surface for facilitating the locking of the clip 10. In the preferred embodiment, the clip 10 is mounted upon the connector housing 16 and is not intended to be removed from the connector housing 16.

The retaining head 40 is adapted to engage the upset 14 of tube 12. The retaining head 40 is generally hook shaped and is defined by a pair of spaced fingers 46 which end in engaging ears 48. As disclosed, the spaced fingers have a rounded end portion 50 for engaging the upset 14. The engaging ears 48 extend inwardly to form a reduced space between the finger 46 and then are bent outwardly to form a surface 52 to allow a user to force the ears 48 from about the tube 12 when the clip 10 is to be locked. The reduced space between the fingers 46 has a width which is less that the diameter of the tube 12. In this way, the ears 46 can be biased outwardly to receive the tube 12. This is illustrated in FIG. 5.

The body portion 42 is defined by a channel having a base 54 and sidewalls 56. The sidewalls 56 extend generally perpendicular to base 54 and end in an edge 58. In the disclosed embodiment, the edge 58 is contoured to have the same general shape as and to generally mate with the exterior contour of connector housing 16. The channel shape of body portion 42 adds strength to the clip and provides tube pull-off retention in excess of 100 LBS force.

As can be seen, the retaining head 40 extends outwardly from the body portion 42 at an angle with respect to the body portion 42. The retaining head 40 is spaced from the body portion 42 by a distance which is slightly greater than the width of the overturned edge 60 of the connector housing 16. This space allows the retaining head 40 to be inserted into the connector housing 16.

The base portion 44 includes spaced leg members 62 which extend outwardly from body portion 42 and are joined at their ends 64. As shown in FIG. 6, the ends 64 are bent over to form mating lips 66 that can be easily snapped together and easily released. Legs 62 are normally biased outwardly.

Leg members 64 are preferably elongated relatively thin members having sides 68 and top and bottom edges 70. The sides 68 are spaced apart a distance which is slightly less than the outer diameter of the third section 34 of connector housing 16. Because the distance is less, legs 64 are biased against third section 34, but are free to slide with respect to section 34. Each of the sides 66 have outwardly bowed sections or detents 72 for receipt of the third section 34 as leg members 64 are slid along the third section 34. Detent 72 corresponds to the unlocked position, see FIG. 1, and detent 74 corresponds to the locked position, see FIG. 4, of clip 10.

The top edge 70 of each leg member 62 defines a cam surface shown generally at 74. The cam surface 74 interconnects the detents 72 and 73, and functions to pull the retaining head 40 into the connector housing 16 to engage the upset 14. Cam surface 74 engages the base 36 of the second section 30. In the embodiment illustrated in FIG. 4, the third section 34 has a guide or retaining surface 76 to keep the leg members 62 adjacent to the base 36. It should be understood that some connectors do not have feature 76. It is not necessary to the proper functioning of the clip 10.

In use, the clip 10 is initially in the position illustrated in FIG. 4. It is intended that the clip 10 always remain attached to the connector housing 16 and in particular to third section 34. In the disclosed embodiment, clip 10 is mounted onto the third section 34 by separating the legs 62 and placing the third section 34 between them and then snapping the ends 64 together. As stated above, the legs 52 bias against section 34.

With reference to FIG. 5, the first step in locking the tube 12 with respect to the connector housing 16 is to rotate the clip 10 against the tube 12. With slight pressure against base 54 of body member 42, just behind head 40, the engaging ears 48 can be forced apart and about tube 12. The rotation of clip 10 is facilitated by the interaction of detent 72 with respect to the third section 34 which forms a pivot point. As can be seen, the edge 74 of preferably abutting the base 36 of second section 30.

Referring now to FIG. 5, the camming action of edge 74 is illustrated. With pressure applied to base 54 of body member 42 just behind the base member 44, the legs are caused to slide along the third section 34 and the cam surface 74 is caused to cam against the base 36. It should be appreciated that the ears 48 are biased against the tube 12 and form a pivot point with respect to member 12. As pressure is applied, the ears 48 pivot and will slide with respect to the tube 12 in the direction of connector housing 16 as the cam surface 74 is cammed against base 36.

With reference to FIG. 7, the clip 10 is in the locked position. In this position, the detent 73 is engaging the third section 34 and the retaining head 40 is inserted into the connector housing to retain the tube 12 therein. The top edge 70 of legs 62 is abutting the base 36. In this way, the retention force of the clip or the pull-out strength is determined by the shear strength of the body member 42 at the intersection of the head 40 and base member 44. As should be appreciated, the tip 50 of ears 48 is generally aligned with the line of contact of the detent 72 and the base member 36 to reduce the bending moment in the body member 42. Additionally, the edge 58 is illustrated as closely conforming to the outer contour of the connector housing 16.

To disconnect the tube 12 from the connector housing 16, the base member is slid away from the connector housing 16 to the position illustrated in FIG. 6. As above, the edge 70 and cam 74 abut the base 36 and the retaining head 40 is slid out of the connector housing 16 and pivots about the tube 12. In the position illustrated in FIG. 6, a user can push against the surface 52 of engaging ears 48 to spread the fingers to release the retaining head 40 from the tube 12. The clip 10 pivots about detent 72 to the position illustrated in FIGS. 1 and 2.

As should be appreciated, the clip 10 can be locked and unlocked without the need for tools. What has been disclosed, is a quick connector which provides a redundant clip having superior pull-off strength which is easy to manufacture and easy to use and that it does not require the use of tools. Additionally, the clip provides visual indication of a properly locked assembly and precludes outflow of fluid if there is improper connection of the primary connector, and which overcomes the disadvantages of the prior art. The form of the invention illustrated and described herein is a preferred embodiment of these teachings. It is shown as an illustration of the inventive concepts, however, rather than by way of limitation, and it is pointed out that various modifications and alterations may be made within the scope of the appended claims.

What is claimed is:

1. A locking clip for use in retaining a male member, having an upset portion, within a female connector, having a recess for receiving said male member and said upset, comprising:

a retaining head for engaging said upset when said male member is positioned within said recess of said female connector; and a base portion distal from said retaining head and having two spaced leg members that each have an inner surface spaced apart a distance slightly less than an outer diameter of said female connector such that said inner surfaces bias against said female connector, said leg members having a cam surface that engages said female connector to facilitate the insertion of said retaining head into said recess of said female connector.

2. The locking clip of claim 1, wherein said cam surface is disposed on a top surface of each said leg member.

3. The locking clip of claim 1, wherein said cam surface is disposed on said inner surfaces of said leg members.

4. The locking clip of claim 1, wherein said cam surface is further distal from said head toward ends of said leg members.

5. The locking clip of claim 1, wherein said female connector has an outer surface that is contoured to define at least a first section and a reduced diameter second section, and wherein said inner surfaces on said leg members bias against said second section.

6. The locking clip of claim 5, wherein said cam surface engages said second section.

7. The locking clip of claim 1, wherein said clip has a latched and an unlatched position, said latched position including said retaining head positioned within said female connector recess.

8. The locking clip of claim 7, wherein said leg members further comprise detents for receiving said female member when said clip is in said latched position.

9. The locking clip of claim 1, further comprising a body portion having a first wall and two sidewalls extending between said retaining head and said base portion, said two sidewalls extending generally perpendicular and away from said first wall and having an exterior profile shaped to generally matingly conform to an exterior surface on said female connector.

10. A quick connect assembly comprising:

a male member having an upset portion;

a female housing having a primary connector positioned therein, said housing receiving said male member and said upset; and a generally L-shaped clip including a body portion with a retaining head near a first end of said body portion adapted to be at least partially received within said housing and for engaging said upset portion when said male member is received within said housing, said clip further including a base portion distal from said retaining head and having spaced legs extending outwardly from said body portion, said clip being pivotable and slidable relative to said housing between a latched and an unlatched position.

11. The assembly of claim 10, wherein said legs further comprise a detent on each said leg such that said housing is received between said detents in said latched position.

12. The assembly of claim 10, wherein said legs further comprise first and second detents on each said leg such that said housing is received between said first detents in said latched position and between said second detents in said unlatched position.

13. The assembly of claim 10, wherein said clip further comprises a cam surface defined on a surface of each said leg.

14. The assembly of claim 13, wherein said cam surface is defined on a top surface of each said leg.

15. The assembly of claim 13, wherein said cam surface is defined on an inside surface of each said leg.

16. The assembly of claim 15, further comprising a detent on each said leg near said cam surface, said housing being received between said detents in said latched position.

17. The assembly of claim 13, wherein said cam surface facilitates relative pivotal movement between said clip and said housing.

18. The assembly of claim 10, wherein said body portion has a channel having a first wall and two sidewalls extending generally perpendicular from said first wall and ending in an edge that is contoured to generally conform to an exterior contour of said female housing.

19. A locking clip for use in retaining a male member that has an upset portion within a female housing member that has a recess for receiving said male member and said upset, comprising:

a first portion for engaging said upset when said male member is received in said recess;

a body portion extending from said first portion and adapted to be conformingly placed against said housing when said clip is in a locked position; and a third portion distal from said first portion and having two leg members extending away from said body portion, said leg members having a cam surface adjacent a pair of detents such that said cam surface engages an exterior portion of said housing to facilitate said detents receiving said housing, thereby placing said clip in said locked position.

* * * * *